(12) United States Patent
Ma

(10) Patent No.: US 10,204,101 B2
(45) Date of Patent: *Feb. 12, 2019

(54) LEXICON EXTRACTION FROM NON-PARALLEL DATA

(71) Applicant: INTERNATIONAL BUSINESS MACHINES CORPORATION, Armonk, NY (US)

(72) Inventor: Tengfei Ma, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,545

(22) Filed: Nov. 8, 2017

(65) Prior Publication Data
US 2018/0285352 A1 Oct. 4, 2018

Related U.S. Application Data

(63) Continuation of application No. 15/471,723, filed on Mar. 28, 2017.

(51) Int. Cl.
*G06F 17/28* (2006.01)

(52) U.S. Cl.
CPC ................. *G06F 17/2836* (2013.01)

(58) Field of Classification Search
CPC .............. G06F 17/28; G06F 17/2836
USPC ......................................... 704/9, 2
See application file for complete search history.

(56) References Cited

U.S. PATENT DOCUMENTS

| 7,313,556 | B2 | 12/2007 | Gallivan et al. |
| 7,620,539 | B2 | 11/2009 | Gaussier et al. |
| 7,823,065 | B2 | 10/2010 | Hintz |
| 8,234,106 | B2 | 7/2012 | Marcu et al. |
| 8,306,806 | B2 | 11/2012 | Shi et al. |
| 9,530,161 | B2 | 12/2016 | Sawaf |
| 2006/0200338 | A1 | 9/2006 | Cipollone et al. |
| 2014/0229158 | A1* | 8/2014 | Zweig ............. G06N 3/04 704/9 |

OTHER PUBLICATIONS

List of IBM Patents or Patent Applications Treated as Related dated Nov. 8, 2017, 2 pages.
Daniel Andrade et al., "Robust Measurement and Comparison of Context Similarity for Funding Translation Pairs", Proceedings of the 23rd International Conference on Computation linguistic (COLING 2010). Aug. 23-27, 2010. pp. 19-27.

(Continued)

*Primary Examiner* — Jakieda R Jackson
(74) *Attorney, Agent, or Firm* — Tutunjian & Bitetto, P.C.; Vazken Alexanian

(57) ABSTRACT

A computer-implemented method executed on a processor for lexicon extraction from non-parallel data is provided. The computer-implemented method includes representing each word of a plurality of words by a vector of documents in which the word appears, modeling each word as a topic distribution by using the vector of documents, receiving a first word in a source language, and finding a second word in a target language as a translation of the first word based on similarity of topic distributions of the first word and the second word.

10 Claims, 7 Drawing Sheets

(56) References Cited

OTHER PUBLICATIONS

Boyd-Graber et al., "Multilingual Topic Models for Unaligned Text", Proceedings of the 25th Conference on Uncertainty in Artificial Intelligence (UAI 2009). Jun. 18-21, 2009. pp. 1-8.
Fung et al., "An IR Approach for Translating New Words from Nonparallel, Comparable Texts", Procedings of the 17th International Conference on Computational Linguistics—vol. 1 (COLING 1998) Aug. 10-14, 1998. pp. 414-420.
Fung et al., "Mining Very-Non-Parallel Corpora: Parallel Sentence and Lexicon Extraction via Bootstrapping and EM", Proceedings of the 2004 Conference on Empirical Methods of Natural Language Processing (EMNPL 2004). Jul. 25-26, 2004. pp. 1-7.
Pascale Fung, "A Statistical View on Bilingual Lexicon Extraction: From Parallel Corpora to Non-Parallel Corpora", Proceedings of the Third Conference ofthe Association forMachine Translation in the Americas on Machine Translation and Information Soup (AMTA 1998). Oct. 28-31, 1998. pp. 1-17.
Tengfei Ma, "Inverted Bilingual Topic Models for Lexicon Extraction from Non-parallel Data", Lecture Noted in Computer Science; Computation and Language. Dec. 21, 2016. pp. 1-17. (Grace Period Disclosure.).
Munteanu et al., "Extracting Parallel Sub-Sentential Fragments from Non-Parallel Corpora", Proceedings of the 21st International Conference on Computational Linguistics and 44th Annual Meeting of the ACL. Jul. 17-18, 2006. pp. 81-88.
Munteanu et al., "Improving Machine Translation Performance by Exploiting Non-Parallel Corpora", 2006 Association for Computational Linguistics. vol. 31; No. 4. Mar. 3, 2005. pp. 477-04.
Tamura et al., "Bilingual Lexicon Extraction from Comparable Corpora Using Label Propagation", Proceedings of the 2012 Joint Conference on Empirical Methods of Natural Language Processing and Computational Natural Language Learning. 2012 Association for Computational Linguistics. Jul. 12, 14, 2012. pp. 24-36.
Vulić et al., "Cross-Language Information Retrieval Models Based on Latent Topic Models Trained with Document-Aligned Comparable Corpora", Information Retrieval. vol. 16; Issue 3. Jun. 1, 2013. pp. 331-368.
Vulić et al., "Identifying Word Translations from Comparable Corpora Using Latent Topic Models", Proceedings of the 49th Annual Meeting of the Association for Computational Lingustics: Shortpapers. 2011 Association for Computational Linguistics. Jun. 19-24, 2011. pp. 479-484.

* cited by examiner

LEXICON EXTRACTION FROM NON-PARALLEL DATA

The following disclosure is submitted under 35 U.S.C. 102(b)(1)(A) as prior disclosures by, or on behalf of, a sole inventor of the present application or a joint inventor of the present application:

"Inverted Bilingual Topic Models for Lexicon Extraction from Non-parallel Data," Tengfei Ma, IBM T. J. Watson Research Center, Yorktown Heights, N.Y., USA.

BACKGROUND

Technical Field

The present invention relates generally to data-driven machine translation, and more specifically, to systems and methods for lexicon extraction from non-parallel data.

Description of the Related Art

The rapid growth of the Internet has produced massive amounts of multilingual information that has been available on different information channels. The number of non-English pages is rapidly expanding. According to recent reports, 49.4% of the websites on the Internet are written in non-English languages and this number is still increasing because the growth rate of English websites is much lower than many other languages such as Spanish, Chinese or Arabic. In this multi-language environment, one challenging but desirable task is to integrate the information in different languages.

SUMMARY

In accordance with one embodiment, a computer-implemented method executed on a processor for lexicon extraction from non-parallel data is provided. The computer-implemented method includes representing each word of a plurality of words by a vector of documents in which the word appears, modeling each word as a topic distribution by using the vector of documents, receiving a first word in a source language, and finding a second word in a target language as a translation of the first word based on similarity of topic distributions of the first word and the second word.

In accordance with another embodiment, a system for lexicon extraction from non-parallel data is provided. The system includes a memory and at least one processor in communication with the memory, wherein the computer system is configured to represent each word of a plurality of words by a vector of documents in which the word appears, model each word as a topic distribution by using the vector of documents, receive a first word in a source language, and find a second word in a target language as a translation of the first word based on similarity of topic distributions of the first word and the second word.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
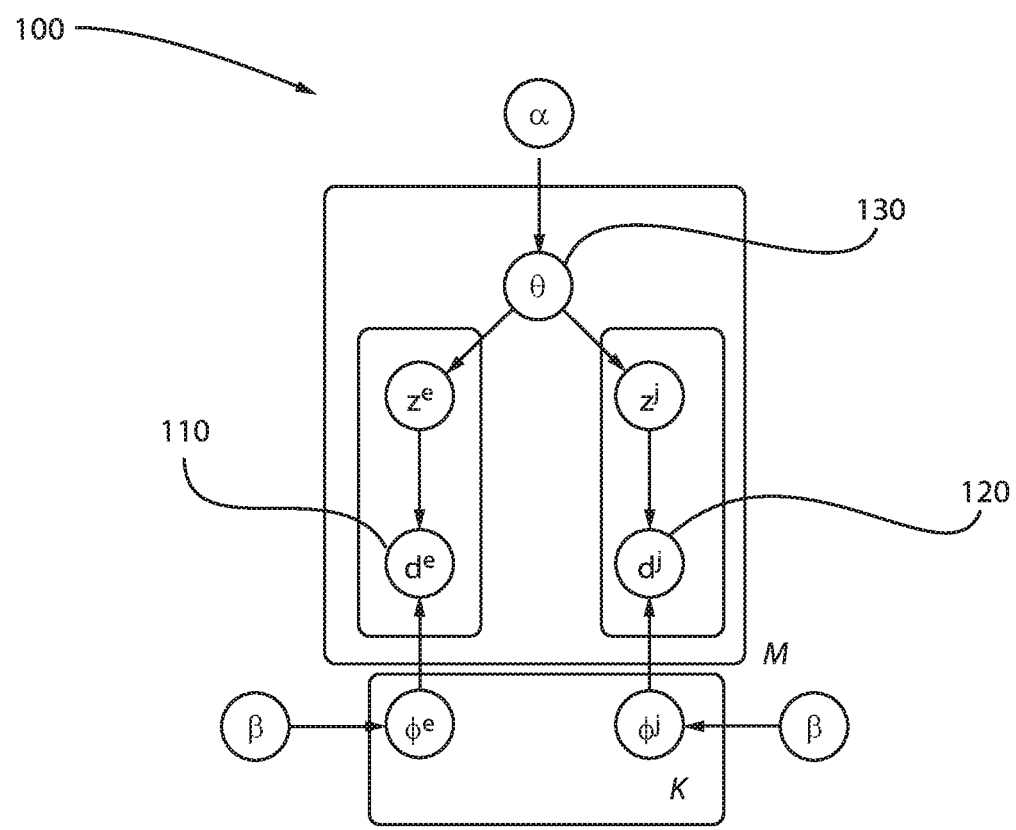
FIG. 1 is a block/flow diagram of an exemplary bilingual LDA (Latent Dirichlet Allocation), in accordance with an embodiment of the present invention.

Embodiments in accordance with the present invention provide methods and devices for lexicon extraction. Machine translation (MT) concerns the automatic translation of natural language sentences from a first language (e.g., Greek) into another language (e.g., English). Systems that perform MT techniques are said to "decode" the source language into the target language. Statistical machine translation (SMT) divides the task of translation into two steps: a word-level translation model and a model for word reordering during the translation process. The statistical models can be trained on parallel corpora. Parallel corpora contain large amounts of text in one language along with their translation in another.

Embodiments in accordance with the present invention provide methods and devices for extracting translation pairs from non-parallel cross-lingual corpora. Two new bilingual topic models are presented to better capture the semantic information of each word while discriminating or discerning the multiple translations in a noisy seed dictionary. The bilingual topic models reverse the roles of documents and words. Each word is represented as a document and then the words are modeled as topic distributions (instead of the original documents). Thus, inverted indexing is used to represent a word as a list of documents in which it occurs. As a result, connections between words are considered, which in turn results in topics in different languages being connected.

Bilingual lexicons play an important role in cross-lingual information retrieval and text mining tasks. However, there is often no existing dictionary for technical data or low-resourced language pairs. Creating a good bilingual lexicon costs a lot, so automatic lexicon extraction has long been studied in the area of natural language processing. For example, extracting translation pairs in a special domain has attracted a lot of attention. There are always novel words or new expressions emerging, and a generic dictionary can hardly keep up with these.

The exemplary embodiments of the present invention propose the utilization of topic models to better measure the semantic relatedness and resolve the noise problem in a seed dictionary. Bilingual topic models have been successfully used for lexicon extraction from comparable data. However, such models have not been applied to non-aligned data because in a topic model, one can only represent the topic distributions for documents, and it is difficult to integrate the word relationship into the model.

In contrast, document relationship is easily modeled by this kind of model. Considering this feature of topic models, the present invention develops a new approach to topic modeling by reversing the roles of documents and words in a topic model. Each word is represented as a pseudo document and the words are modeled, instead of the original documents. Inverted indexing is further used to represent a word as a list of documents in which it occurs. After obtaining the pseudo documents, topic models are used to model each word as a topic distribution. Different from the motivation of previous work related to cross-lingual inverted indexing, the present invention does not consider connections between documents, but only connections between words. Each translation pair is assumed to own the same topic distribution. In this way, the topics in different languages can also be connected. Next, in order to solve the problem of noisy translations in the seed dictionary, a new hierarchy is added in the models to integrate the probability of translations.

The translations in the seed dictionary are not always regarded as true. Instead, they are selected with a probability based on the topic similarities. In addition, the models are semi-supervised, as only a subset of the words are translated, and the remaining words do not have any connection with words in other languages. This means the present invention can utilize all the data instead of only the connected data that is modeled in the original Bilingual LDA (Latent Dirichlet Allocation).

The exemplary embodiments of the present invention use Gibbs sampling for posterior inference. Once the topic distributions for each word are derived, the similarity between words across languages on the basis of their topic distributions are obtained. In contrast to conventional cosine similarity and KL divergence, the present invention defines similarity measures as the probability of a word generating another. Given a word in a source language, the word with the most similar topic distributions in the target language is then regarded as its translation.

Therefore, the exemplary embodiments of the present invention advance a new framework of lexicon extraction by combining inverted indexing and topic models. The new framework uses new topic models that extend the classical Bilingual LDA (Latent Dirichlet Allocation) from two major aspects: 1) incorporating all words into the model instead of using only connected words, and 2) allowing multiple translations and modeling the probability of each word. A similarity measure of two words is defined across languages from the conditional generating probability.

The present invention further focuses on extracting special dictionaries from non-parallel data. Instead of parallel/comparable documents, conventional systems use a seed dictionary as the pivots. Generally, this approach can be factorized into two steps: 1) construct a context vector for each word, and 2) compute the context similarities on the basis of pivot words (e.g., seed dictionary entries). A common hypothesis is that a word and its translation tend to occur in similar contexts. Conventional systems have defined various correlation measures to construct a context vector representation for a word and pointwise mutual information (PMI). As for the similarity computation, cosine similarity, non-aligned signatures (NAS), and Johnson-Shannon divergence, etc. can be used. The context similarity-based models rely on the quality and the size of seed dictionaries.

When a seed dictionary is small, the context vector will be too sparse and the similarity measure is not accurate enough. Conventional systems have used graph-based methods to propagate the seed dictionaries. There are also some methods that project the word vectors in different languages into the same low-dimensional space, such as linear transformation for cross-lingual word embedding. The present invention uses a topic model to represent each word as a topic distribution in order to avoid the sparseness of context vectors. However, while the previous approaches generally just select the reliable translations as seeds, the exemplary embodiments of the present invention assume that the seed dictionary is noisy. The probability of existing translations is further added as a new latent variable to make the models more robust and generalizable.

FIG. 1 is a block/flow diagram of an exemplary bilingual LDA 100 (Latent Dirichlet Allocation), in accordance with an embodiment of the present invention.

It is assumed that only two mono-lingual corpora in different languages are given, $C^e$ and $C^j$. They are neither sentence-aligned nor document-aligned, but are in the same domain. The documents in $C^e$ are noted as $\{d_i^e\}$ for i=1, ... $N^e$ where $N^e$ is the number of documents in $C^e$; while the documents in $C_j$ are noted as $\{d_i^j\}$ 120 for i=1, ... $N^j$ where $N^j$ is the number of documents in $C^j$. Other than the data corpora, a set of seed dictionaries are also used. It is assumed that the seed dictionary comes from the generic domain, and is noisy. It means one term in the seed dictionary can have several translations, within which some translations are not correct in this domain. Now, given a term in the source language $t^j$ which appears in $C^j$, the most possible translation term in $C^e$ needs to be found.

Topic models have been successfully used for lexicon extraction in parallel/comparable corpora. A classical bilingual LDA requires the documents to be aligned in pairs. The basic idea is that an aligned document pair should have the same topic distribution θ (130). For each document pair $<d_{j1}, d_{j2}>$, a topic distribution θ (130) is drawn from a Dirichlet distribution:

θ~Dirichlet(α).

Then, for each language l, a topic assignment is sampled for each word, as $z^l$~Multinomial(θ).

As the final step, words in each language are separately drawn from their topic assignment and topic-specific distribution $\phi_z^l$~Dir($\beta^l$):

$\omega^l$~Multinomial($\phi_z^l$)

In this way, the topics in different languages can be connected. Moreover, the similarity of documents in different languages can be measured (e.g., $d_i$, $d_k$, simply by computing the similarity of their topic distributions Sim($\theta_i$, $\theta_k$)). The bilingual topic models can also be extended to multiple languages and multiple modals. However, most of these models don't consider the probability of the multiple translations or the noise in their dictionary. Conventional systems integrate the prior of word matchings to the bilingual topic models in nonparallel data, but their model has no effect on finding new word translations. The topic models for citation networks belong to another category of conventional work. The idea is similar to the cross-lingual topic models. The cited document should have a similar topic distribution to the citing document. However, a document can have multiple cited documents, so its topic distribution is not totally the same as any of its cited documents.

The present approach to lexicon extraction is to first use topic models to model the cross-lingual data and obtain the topic distribution of each word. Then, the topic distributions are compared to compute the word similarities and get the translation.

In a conventional topic model, only the documents are represented by topic distributions, while the topic distribution for a word is not explicit. In addition, it is relatively easy to model document pairs or document relationships by various topic models, as discussed earlier. However, in the present invention, only a seed dictionary and non-parallel data corpora are used, so it is difficult to find document relationships. However, it is easy to get word translation pairs. The motivation is that if a word can get transferred into a pseudo document, the word relationship can be utilized in seed dictionaries. In order to implement this idea, the document-word index is inverted so that a word is constructed by a list of document IDs. It is assumed a word w that appears in $d_1$ twice, $d_2$ once, and $d_3$ once, it is represented as $(d_1, d_1, d_2, d_3)$. The word frequency is also kept in this representation.

The exemplary embodiments of the present invention integrate inverted indexing and topic models. Of course, there are other ways to construct the pseudo documents, such as using neighbor words. However, there are far fewer documents than context words. In addition, using inverted indexing-based representation enables one to easily calculate $p(d|w) = \Sigma_z p(d|z) p(z|w)$ from the topic distributions. Thus, the present invention can achieve the conditional probability of all documents when given a search a term in another language. This might be useful for cross-lingual information retrieval tasks.

To avoid confusion, in the following sections the term "word" is used to refer to the pseudo document in topic models and the term "document" is used to refer to the basic element in a pseudo document. Thus, a topic is a distribution of documents, and a word is a mixture of topics. That is to say, the roles of "words" and "documents" have been reversed compared to conventional topic models.

Once the pseudo documents are obtained, they can be used to train a Bilingual LDA model. If two words are translations of each other, they are assumed to have similar topic distributions. The issue presented is that only a subset of words are translated, and a word in a seed dictionary can have several translations. Therefore, first one-to-one word pairs need to be constructed, the same as what Bilingual LDA does for documents.

Intuitively, it is not a good choice to make all translations modeled because if a word has polysemy, the different translations will own the same topic distribution. Instead, the most frequent term in the translation list is selected to form a translation pair. Then, for all translation pairs, the same model as the Bilingual LDA (FIG. 1) is used. Words that do not have translations are modeled together using the original LDA.

For each translation pair $t^j$, $t^e$, sample a topic distribution $\theta$~Dirichlet($\alpha$).

For each word $t_l$($l \in \{j, e\}$) without translation, sample a topic distribution $\theta_l$~Dirichlet($\alpha$).

Following this process, the topics for each token $d^e$ and $d^j$ are sampled from theta and then documents are drawn from the topic. Additionally, instead of just selecting one translation, a translation was randomly selected in each sample iteration, which means the present invention used all the translations over all iterations. This model is referred to as BiLDA all, while the previous model can be referred to as BiLDA.

Figure 2:
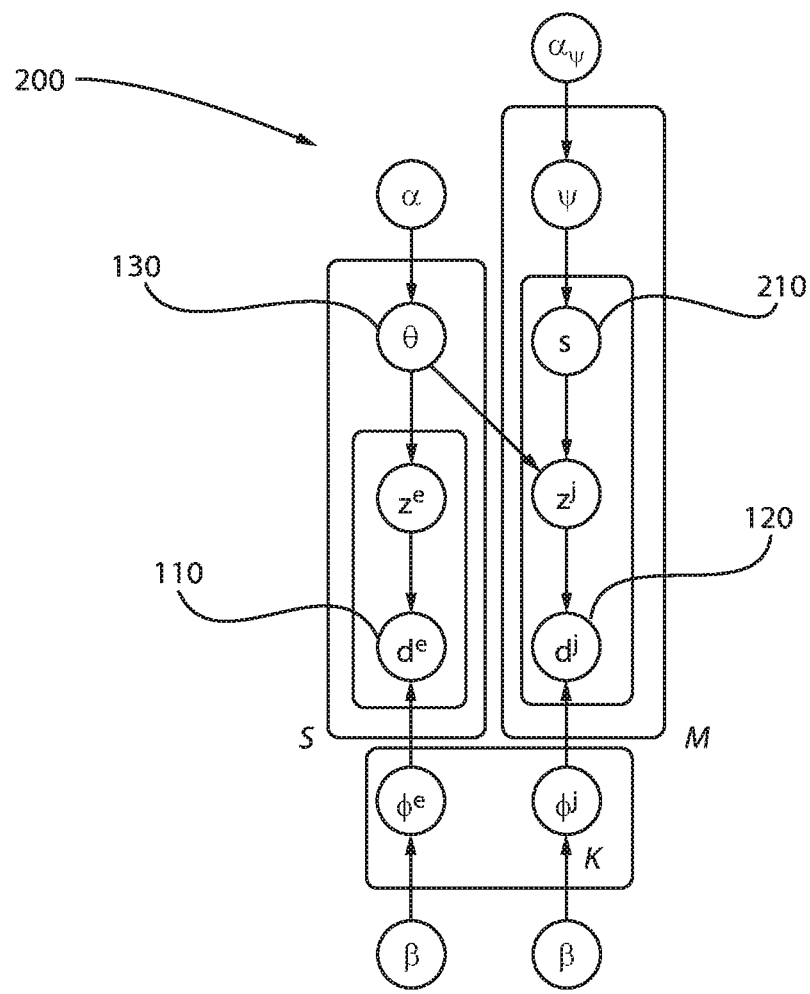
FIG. 2 is a block/flow diagram of an exemplary probabilistically linked bilingual LDA (ProbBiLDA), in accordance with an embodiment of the present invention.

FIG. 2 is a block/flow diagram of an exemplary probabilistically linked bilingual LDA (ProbBiLDA) 200, in accordance with an embodiment of the present invention.

If just one translation is selected, there is a risk of losing a lot of information. This is especially problematic when the seed dictionary is not large, as the lost information causes a decrease in performance. On the other hand, using all translations without discrimination is not ideal either. However, a solution to properly select the correct translation for each word has been implemented.

Two approaches were developed to model the probability of translation selection. The first approach is to add a selection variable for each token (e.g., each document) d word $t^j$, such that the topic distribution of each $t^j$ is a mixture of its translations. This is similar to the idea of citation models, which model the probability of citation as the influence rate. The difference is that two sets of topics for the two respective languages are utilized. The topics of the "cited" pseudo document are not directly shared, opting instead to use the "cited" topic distribution to sample a new topic in its own language. This model is referred to as ProbBiLDA (probabilistically linked bilingual LDA), as shown in FIG. 2. The generative process of the ProbBiLDA is as follows. For a description of all the variables, please see Table 1 depicted below.

TABLE 1

Figure 3:
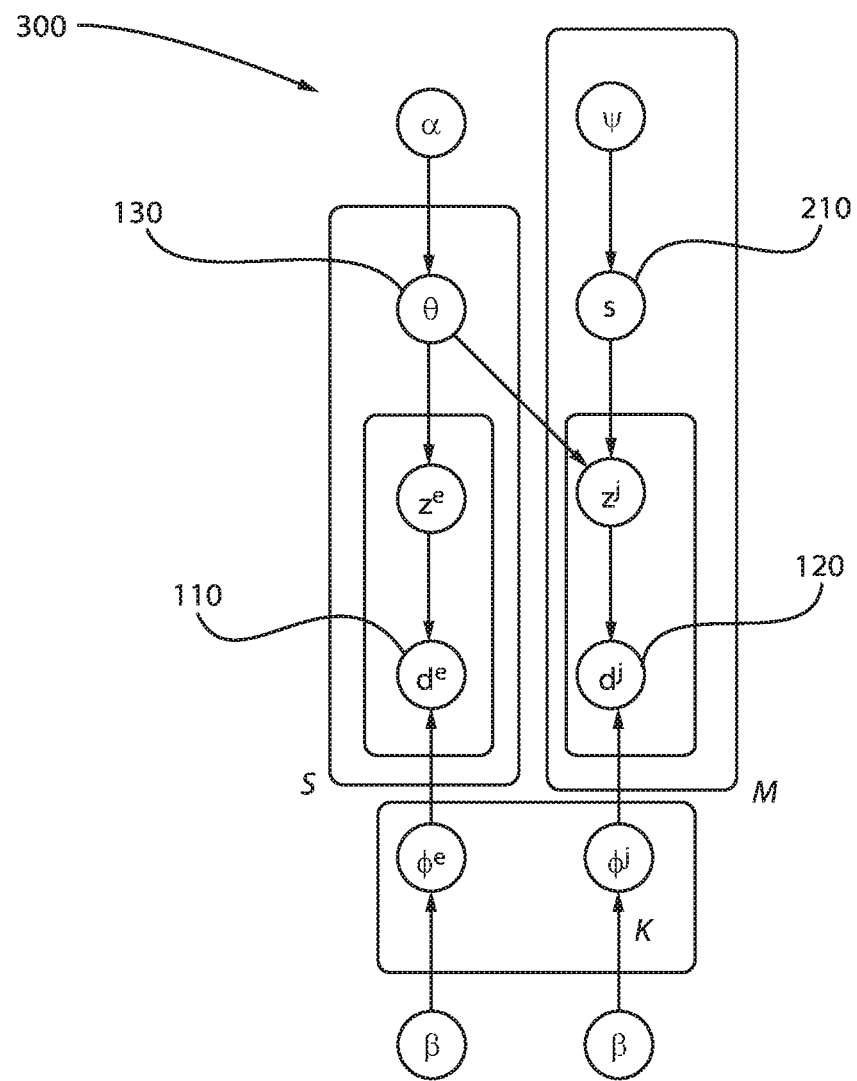
FIG. 3 is a block/flow diagram of an exemplary block probabilistically linked bilingual LDA (BlockProbBiLDA), in accordance with an embodiment of the present invention.
Figure 4:
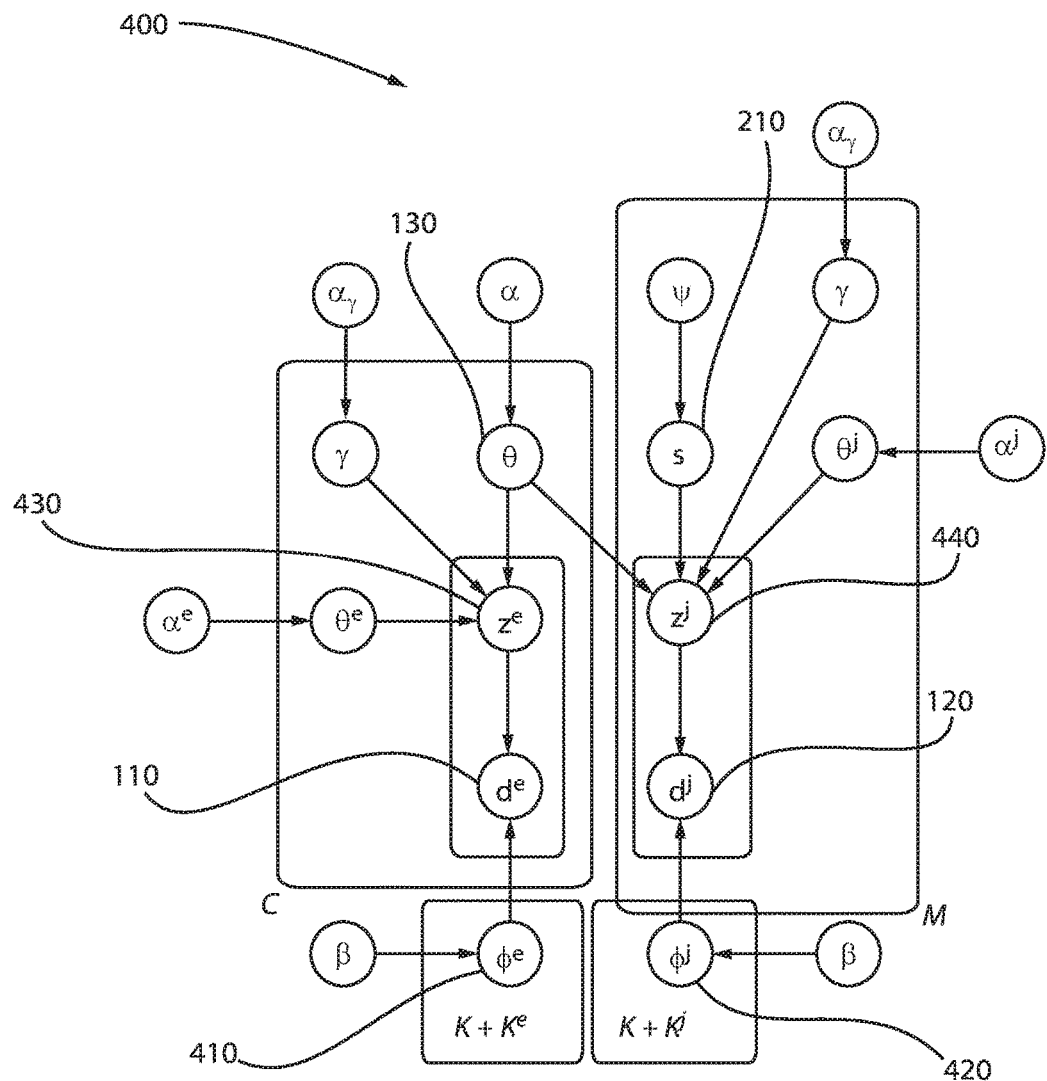
FIG. 4 is a block/flow diagram of an exemplary generative process of the block probabilistically linked bilingual LDA (BlockProbBiLDA), in accordance with an embodiment of the present invention.

Notations for topic models in Figure 2, Figure 3, Figure4

| | |
|---|---|
| $\alpha, \beta$ | hyperparameters for Dirichlet distribution |
| $\theta$ | topic distribution for a word |
| $\phi^e, \phi^j$ | document distribution for each topic |
| $z^e, z^j$ | topic assignment for each document |
| $d^e, d^j$ | documents in each word (i.e. IDs of the original documents that a word appears in.) |
| $\psi$ | distribution of the translation selections |
| s | selecting a translation for a document (Figure 2) or for a word (Figure 3) |
| M | number of words |
| K | number of topics |

For each topic $z^l \in \{1, \ldots K\}$ in language l ($l \in \{e, j\}$), the sample document distribution is: $\varphi^l$~Dir($\beta$).

For each word $t^e$, sample a topic distribution $\theta_{t^e}$~Dir($\alpha$)

For each position i in the word, sample a topic assignment from $z_i^e$~Multi($\theta_{t^e}$) and draw a document $d_i^e$~Multi($\phi_{z_i^e}^e$)

For each word $t^j$, if this word does not have a translation in the seed dictionary, then sample a topic distribution $\theta_{t^j}$~Dir($\alpha$).

For each position i in the word, sample a topic assignment from $z_i^j$~Multi($\theta_{t^j}$).

If the word has S translations 210, draw a probability distribution: $\psi_{t^j}$~Dir($\alpha_\psi$) over all translations.

For each position i in the word, sample a translation $s_i \sim \text{Multi}(\psi_{t^j})$ from the S translations 210.

Additionally, draw a topic $z_i^j \sim \text{Multi}(\theta_{s_i})$ and draw a document $d_i^j \sim \text{Multi}(\phi_{z_i^j})$.

FIG. 3 is a block/flow diagram of an exemplary block probabilistically linked bilingual LDA (BlockProbBiLDA) 300, in accordance with an embodiment of the present invention.

Another way to model the probability of translations is to add the probability variable to the word itself instead of to each document in that word. That is to say, a translation for the whole word is selected, and all the documents in that word follow the same topic distribution.

For example, a word t=(d1, d2) has three translations t1, t2, t3. If the ProbBiLDA is used, the topic of each document in word t is sampled from different translations, e.g., $z_{d1} \sim \theta_{t2}$ and $z_{d2} \sim \theta_{t3}$. However, in the new model, all documents in t can only select one same translation in each iteration. If t2 is selected as the translation of t, then $z_{d1} \sim \theta_{t2}$ and $z_{d2} \sim \theta_{t2}$.

As all the documents select translations together like a block, this model can be referred to as BlockProbBiLDA. This model is essentially more similar to the original Bilingual LDA. Compared to Bilingual LDA, it does not fix the translation pairs but rather assigns a prior to each translation. Compared to the generative process of ProbBiLDA, it only changes the position of s and uses a uniform prior distribution $\psi$ instead of Dirichlet prior. The graphical representation of BlockProbBiLDA is shown in FIG. 3 and its generative process is as follows:

For each topic $z^l \in \{1, \ldots K\}$ in language l ($l \in \{e, j\}$), sample document distribution $\phi^l \sim \text{Dir}(\beta)$.

For each word $t^e$, sample a topic distribution $\theta_{t^e} \sim \text{Dir}(\alpha)$ over the first K topics.

For each position i in the pseudo document, sample a topic assignment from $z_i^e \sim \text{Multi}(\theta_{t^e})$ and draw a document $d_i^e \sim \text{Multi}(\phi_{z_i^e})$.

For each word $t^j$, if this word does not have a translation in the seed dictionary, then sample a topic distribution $\theta_{t^j} \sim \text{Dir}(\alpha)$.

For each position i in the word, sample a topic assignment $z_i^j \sim \text{Multi}(\theta_{t^j})$.

If the word has S translations 210, sample a uniform probability distribution $\psi_{t^j}$ over all translations.

For each position i in the pseudo document, sample a translation $s_i \sim \text{Multi}(\psi_{t^j})$ from the S translations.

Additionally, draw a topic $z_i^j \sim \text{Multi}(\theta_{s_i})$ and draw a document $d_i^j \sim \text{Multi}(\phi_{z_i^j})$.

FIG. 4 is a block/flow diagram of an exemplary generative process 400 of the block probabilistically linked bilingual LDA (BlockProbBiLDA), in accordance with an embodiment of the present invention.

Regarding the generative process 400, given two monolingual data corpora in some domain, and a generic dictionary, the new topic model is used to extract translations for terminologies in this domain.

In particular, pseudo documents are constructed for each word $w=(d_1, \ldots d_n)$; where $d_i$ is called a token. For example, each word can be represented by a vector of document ids which the word appears in. Context vectors can also be used to represent the word. Then a new topic model can be built, which is called BlockProbBiLDA, and that extends Bilingual LDA by integrating the probability of translations. A latent variable s can be used to select the "correct" translation when a word has multiple translations in the seed dictionary. If s(w)=w', then w and w' share the same topic distribution $\theta$ (130). Besides of the shared topics, the present invention also allows each word to have its own language-specific background topics. The generative process of this model is shown in FIG. 4. Subsequently, Gibbs sampling is used for posterior inference, as described below. The topic distribution $\theta$ (130) (over the shared topics) is obtained for each word and the token distribution for each topic $\phi$ is further acquired.

Moreover, for both of the two new models, a collapsed Gibbs sampling is used to approximate the posterior. The latent variables are iteratively updated (including topic assignment z (430, 440)) given other variables.

Regarding the posterior interference for ProbBiLDA:

In the model of ProbBiLDA, for each document $d_{t^j,i}^j$ in a word $t^j$, it is assumed that it selects a translation word c in target language e, e.g., it is drawn from the topic distribution of this word. Given the translation selection, and other topic assignments, the topic for document $d_{t^j,i}^j$ is sampled according to:

$$p(z_i^j = k \mid z_{-i,t^j}^j, s_i = c, d_{t^j,i}^j = n, \theta) \propto \qquad (1)$$

$$\frac{nmk(c, k) + cmk(c, k) + \alpha - 1}{nm(c) + cm(c) + K*\alpha - 1} * \frac{nkvj(k, n) + \beta - 1}{nkj(k) + V_j * \beta - 1}$$

where nmk(c, k) denotes the number of documents in word c that are assigned to topic k; cmk(c, k) denotes the number of documents with topic k in language e that select c as the translation of its associated word; and cm(c) is the total number of documents in language e with translation selection c. nkvj(k, n) is the number of times when document n is assigned to topic k in language j; and accordingly nkj(k) is the sum of nkvj(k, n) over all documents in language j; $V_j$ is the total number of documents in language j.

Given these topic assignments, the translation selection can be sampled:

$$p(s_i = c \mid s_{-i}, z_i^j = k, d_{t^j,i}^j = n, \theta) \propto \qquad (2)$$

$$\prod_i \frac{nmk(c, k) + cmk(c, k) + \alpha - 1}{nm(c) + cmk(c) + K*\alpha - 1} * \frac{nms(t^j, c) + \alpha_\psi - 1}{nm(t^j) + S(t^j) * \alpha_\psi - 1}$$

where $nms(t^j, c)$ denotes the number of documents in word $t^j$ which selects translation c; $nm(t^j)$ is the number of documents in word $t^j$; and $S(t^j)$ is the number of translation candidates for word $t^j$.

The above sampling scheme is for the source language. While for target language, only the topic assignments need to be dealt with.

$$p(z_i^e = k \mid z_{-i,t^e}^e, d_{t^e,i}^e = n, \theta) \propto \qquad (3)$$

$$\frac{nmk(t^e, k) + cmk(t^e, k) + \alpha - 1}{nm(t^e) + cm(t^e) + K*\alpha - 1} * \frac{nkve(k, n) + \beta - 1}{nke(k) + V_e * \beta - 1}$$

where the denotations of the variables are similar to the ones defined in (1).

Given all the topic assignments, the topic distribution can then be derived: $\theta_m = (\theta_{m,1}, \theta_{m,2}, \ldots, \theta_{m,K})$ for word m.

$$\theta_{m,k} = \frac{nmk(m, k) + \alpha}{nm(m) + K*\alpha} \qquad (4)$$

The topic variables are derived from (elements 410, 420):

$$\phi_k^e = \frac{nkve(k, n) + \beta}{nke(k) + V_e * \beta} \quad (5)$$

$$\phi_k^j = \frac{nkvj(k, n) + \beta}{nkj(k) + V_j * \beta} \quad (6)$$

For example, 1500 iterations can be run for inference while the first 1000 iterations are discarded as burn-in steps. After the sampling chain converges, the value of $\theta_m$ is averaged to obtain the final per-word topic distribution.

Regarding the posterior interference for BlockProb-BiLDA:

For each word $t_e$, its topic is sampled according to:

$$p(z_i^e = k \mid z_{-i,t^e}^e, d_{t^e,i}^e = n, \theta) \propto \quad (7)$$

$$\frac{nmk(t^e, k) + cmk(t^e, k) + \alpha - 1}{nm(t^e) + cm(t^e) + K*\alpha - 1} * \frac{nkve(k, n) + \beta - 1}{nke(k) + V_e * \beta - 1}$$

For each word $t^j$, if it is in the dictionary, and it selects c as its translation in the previous iteration, then:

$$p(z_i^j = k \mid z_{-i,t^j}^j, d_{t^j,i}^j = d, \theta) \propto \quad (8)$$

$$\frac{nmk(t^j, k) + nmk(c, k) + \alpha - 1}{nm(t^j) + nm(c) + K*\alpha - 1} * \frac{nkvj(k, d) + \beta - 1}{nkj(k) + V_j * \beta - 1}$$

The selection of translations is sampled by:

$$p(s^j = t^e \mid z^j, d_{t^j,i}^j = d, \theta) \propto \quad (9)$$

$$\prod_i \frac{nmk(t^e, z_i^j) + \alpha + \sum_{m \in C(t^e)/\{t^j\}} nmk(m, z_i^j)}{nm(t^e) + K*\alpha + \sum_{m \in C(t^e)/\{t^j\}} nm(m)}$$

where $C(t^e)$ is the set of all words which cite $t^e$ as their translations in last iteration; $C(t^e)/\{t^j\}$ means to exclude $t^j$ in this set. As the product of the probabilities is usually very small, $p(s^j=t^e)$ has different orders of magnitude for each $t^e$, so the sampling of $s^e$ can be approximated by selecting the one with largest probability. The following equation is used instead:

$$s^j \approx \arg\max_{t^e} \sum_i \log \frac{nmk(t^e, z_i^j) + \alpha + \sum_{m \in C(t^e)/\{t^j\}} nmk(m, z_i^j)}{nm(t^e) + K*\alpha + \sum_{m \in C(t^e)/\{t^j\}} nm(m)} \quad (10)$$

After sampling the translation selection $s^j=t^e$ for $t^j$, the $C(t^e)$ is updated, as well as $C(t^{e'})$, where $C(t^{e'})$ is the previous selection of $s^j$. Then, a scheme similar to the one in 3.4.1 can be used to obtain topic distribution $\theta$ (130).

Once the topic distribution 130 of each word is obtained, they can be used to calculate the similarity between words. The simplest way to do this is to regard each topic distribution as a vector representation of a word. The cosine similarity between these vectors can then be calculated as follows:

$$\text{Cosine}(\theta_m, \theta_c) = \frac{\sum_{k=1}^K \theta_{mk} \theta_{ck}}{\sqrt{\sum_{k=1}^K \theta_{mk}^2} \sqrt{\sum_{k=1}^K \theta_{ck}^2}} \quad (11)$$

Another measure is to use the Kullback-Leibler (KL) divergence. KL divergence is a measure of difference between two probability distributions that is widely used in previous topic model-based approaches.

$$D_{KL}(\theta_m \| \theta_c) = \sum_{k=1}^K \theta_{mk} \log \frac{\theta_{mk}}{\theta_{ck}} \quad (12)$$

Neither cosine similarity nor KL divergence considers the correlation between topics. For a topic model, as the topic distribution of each word is known, in addition to knowing the topic itself, the present invention can take advantage of the topic structures by directly modeling the probability of $p(w^e|w^j)$ as the similarity between words $w^e$ and $w^j$. This illustrates how likely it is to generate $w^e$ from $w^j$. This similarity measure is referred to as selProb (selection probability).

$$\text{selProb} = p(w^e \mid w^j) \propto p(w^j \mid \theta_{w^e}) = \prod_{i=1}^n \sum_{z^j=1}^K p(d_i^j \mid z^j, \phi^j) p(z^j \mid \theta_{w^e})$$

Then, the most similar word in the target language can be selected as the translation.

$$\arg\max_{w^e} \log p(w^j \mid \theta_{w^e}) = \arg\max_{w^e} \sum_{i=1}^n \log \sum_{z^j=1}^K p(d_i^j \mid z^j, \phi^j) p(z^j \mid \theta_{w^e})$$

In the exemplary embodiments of the present invention, a new framework for extracting translations from non-parallel corpora is introduced. First, pseudo documents are constructed by using inverted indexing. Then, two new bilingual topic models are created, that is, ProbBiLDA and BlockProbBiLDA, to obtain topic distributions for each word. These models are extensions of the classical Bilingual LDA featuring a new hierarchy to integrate the translation probability for multiple translations in the seed dictionary. The exemplary embodiments of the present invention advanced the generation of probability to measure the similarity between one candidate word and a given target word.

Moreover, the exemplary embodiments of the present invention use a new bilingual topic model to better model word relatedness and connect topics in different languages. Topic models have rarely been used in non-parallel bilingual data. The contributions of the present invention include a new framework for lexicon extraction by using topic models in non-parallel data corpora, thus extending classical Bilingual Topic models to deal with a noisy seed dictionary, and using translation probability instead of cosine similarity or KL divergence to avoid topic independence.

Figure 5:
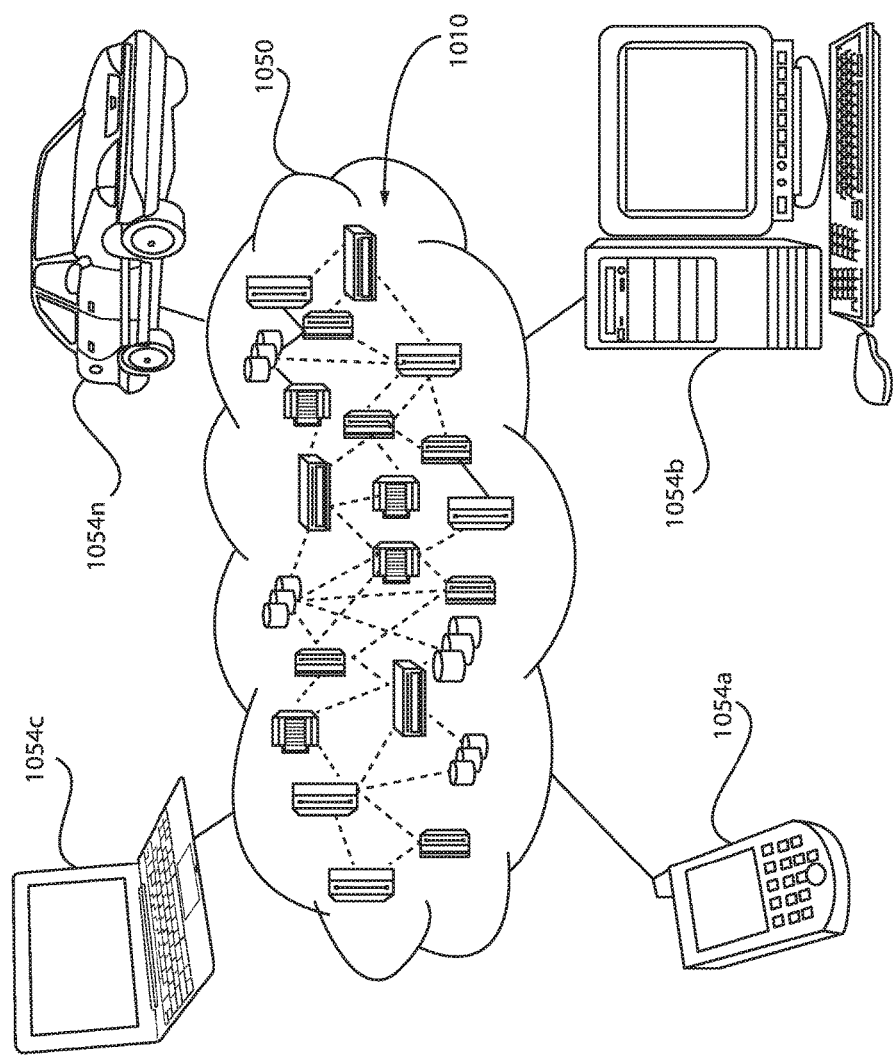
FIG. 5 is a block/flow diagram of an exemplary cloud computing environment, in accordance with an embodiment of the present invention.

FIG. 5 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 1050 is depicted for enabling use cases of the present invention. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N can communicate. Nodes 1010 can communicate with one another. They can be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 5 are intended to be illustrative only and that computing nodes 1010 and cloud computing environment 1050 can communicate with any type of computerized device over any type of network and/or network addressable connection (e.g., using a web browser).

Figure 6:
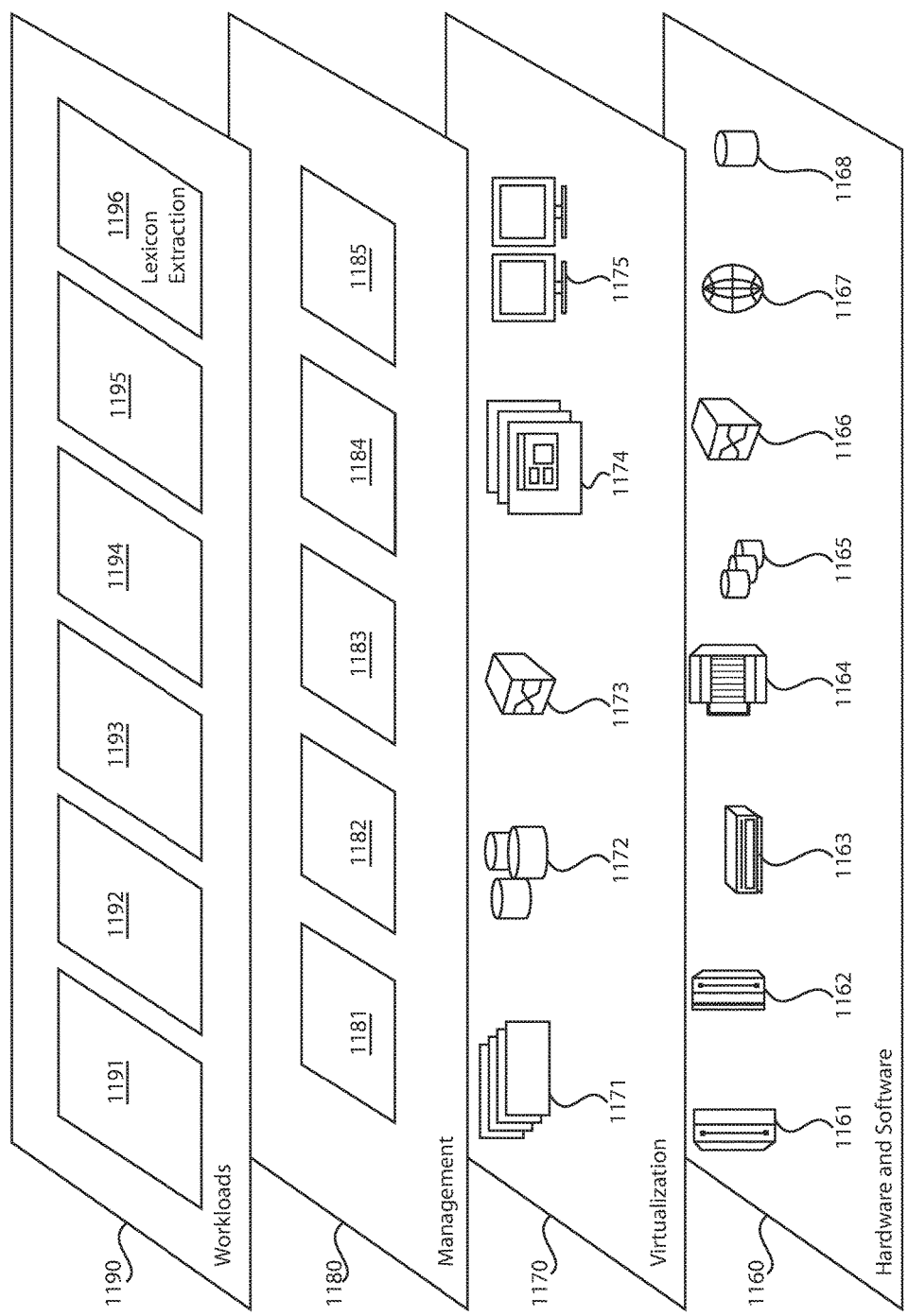
FIG. 6 is a schematic diagram of exemplary abstraction model layers, in accordance with an embodiment of the present invention.

FIG. 6 is a schematic diagram of exemplary abstraction model layers, in accordance with an embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities can be provided: virtual servers 1171; virtual storage 1172; virtual networks 1173, including virtual private networks; virtual applications and operating systems 1174; and virtual clients 1175.

In one example, management layer 1180 can provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment can be utilized. Examples of workloads and functions which can be provided from this layer include: mapping and navigation 1191; software development and lifecycle management 1192; virtual classroom education delivery 1193; data analytics processing 1194; transaction processing 1195; and lexicon extraction from non-parallel data 1196.

Figure 7:
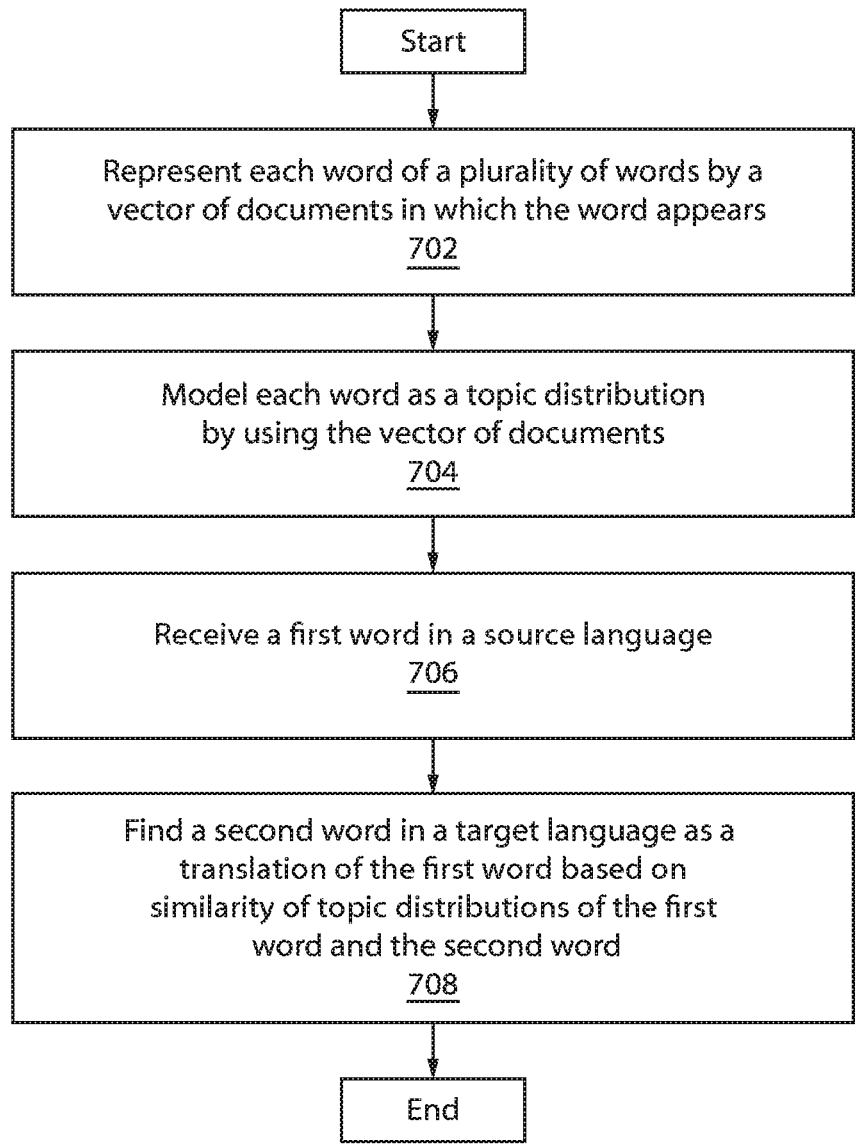
FIG. 7 is a block/flow diagram of an exemplary method for lexicon extraction from non-parallel data, in accordance with an embodiment of the present invention.

FIG. 7 is a block/flow diagram of an exemplary method for lexicon extraction from non-parallel data, in accordance with an embodiment of the present invention.

At block 702, each word of a plurality of words is represented by a vector of documents in which the word appears.

At block 704, each word is modeled as a topic distribution by using the vector of documents.

At block 706, a first word in a source language is received.

At block 708, a second word is found in a target language as a translation of the first word based on similarity of topic distributions of the first word and the second word.

Still yet, any of the components of the present invention could be created, integrated, hosted, maintained, deployed, managed, serviced, etc. by a service supplier who offers to provide a method for enabling lexicon extraction. Thus, the present invention describes a process for deploying, creating, integrating, hosting, maintaining, and/or integrating computing infrastructure, including integrating computer-readable code into the lexicon extraction system, wherein the code in combination with the lexicon extraction system is capable of performing a method for enabling lexicon extraction. In another embodiment, the invention provides a business method that performs the process blocks/steps of the invention on a subscription, advertising, and/or fee basis. That is, a service supplier, such as a Solution Integrator, could offer to provide a method for enabling lexicon extraction. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for lexicon extraction from non-parallel data (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for lexicon extraction from non-parallel data corpora, the method comprising:

extracting, by the processor, a set of noisy seed dictionaries from the non-parallel data corpora, where at least one word of a plurality of words in the set of noisy seed dictionaries has multiple translations;

representing, by the processor, each word of the plurality of words by a vector of documents in which the word appears;

modeling, by the processor, each word as a topic distribution by using the vector of documents, the word being a mixture of topics, the modeling employing a trained bilingual Latent Dirichlet Allocation (LDA) by integrating a probability of translations;

employing latent variables to select a correct translation when the word has multiple translations in the set of noisy seed dictionaries;

employing a collapsed Gibbs sampling to approximate a posterior inference;

iteratively updating the latent variables;

discarding initial iterations for the posterior inference;

receiving a first word in a source language;

finding a second word in a target language employing the set of noisy seed dictionaries as a translation of the first word based on similarity of topic distributions of the first word and the second word and by modeling a probability of translation selection to improve translation accuracy; and outputting the second word on a user interface of a computing device.

2. The computer-implemented method according to claim 1, wherein the lexicon extraction is executed in a cloud computing environment.

3. The computer-implemented method according to claim 1, wherein representing each word by the vector of documents includes using inverted indexing.

4. The computer-implemented method according to claim 1, wherein a relationship is established between each of the plurality of words.

5. The computer-implemented method according to claim 1, wherein topics in the source language and the target language are connected.

6. The computer-implemented method according to claim 1, wherein the similarity of the topic distributions is defined as a probability of one word generating another.

7. The computer-implemented method according to claim 1, wherein a subset of words of the plurality of words is translated and other words remain unconnected from words of other languages.

8. The computer-implemented method according to claim 1, wherein after a sampling chain converges, a value of the topic distribution is averaged to obtain a final per-word topic distribution.

9. The computer-implemented method according to claim 1, wherein a latent variable is used to select a translation when a word has multiple translations in the set of noisy dictionaries.

10. The computer-implemented method according to claim 1, wherein each word has its own language-specific background topic.

* * * * *